United States Patent
Nie et al.

(10) Patent No.: US 9,913,288 B2
(45) Date of Patent: Mar. 6, 2018

(54) DATA TRANSMISSION METHOD, DEVICE, AND SYSTEM

(71) Applicant: Huawei Technologies Co., Ltd., Shenzhen, Guangdong (CN)

(72) Inventors: Guangcai Nie, Chengdu (CN); Anquan Yang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 15/191,013

(22) Filed: Jun. 23, 2016

(65) Prior Publication Data
US 2016/0345350 A1 Nov. 24, 2016

Related U.S. Application Data

(63) Continuation of application No. PCT/CN2013/090325, filed on Dec. 24, 2013.

(51) Int. Cl.
| | |
|---|---|
| *H04J 3/00* | (2006.01) |
| *H04W 72/12* | (2009.01) |
| *H04W 80/00* | (2009.01) |
| *H04L 5/00* | (2006.01) |
| *H04W 28/06* | (2009.01) |
| *H04W 92/20* | (2009.01) |
| *H04W 84/04* | (2009.01) |

(52) U.S. Cl.
CPC ........... *H04W 72/1273* (2013.01); *H04L 5/00* (2013.01); *H04L 5/0035* (2013.01); *H04W 72/1278* (2013.01); *H04W 80/00* (2013.01); *H04W 28/065* (2013.01); *H04W 84/042* (2013.01); *H04W 92/20* (2013.01)

(58) Field of Classification Search
CPC ......... H04W 72/1273; H04W 72/1278; H04W 80/00; H04W 84/042; H04W 28/065; H04W 92/20; H04L 5/0035; H04L 5/00
See application file for complete search history.

(56) References Cited

U.S. PATENT DOCUMENTS

| | | | |
|---|---|---|---|
| 5,526,357 A | 6/1996 | Jandrell | |
| 2005/0088991 A1 | 4/2005 | Kil | |
| 2006/0014536 A1 | 1/2006 | Demirhan et al. | |
| 2013/0176988 A1* | 7/2013 | Wang | H04W 28/08 370/331 |
| 2013/0273857 A1 | 10/2013 | Zhang et al. | |
| 2014/0023015 A1* | 1/2014 | Frederiksen | H04L 5/001 370/329 |
| 2015/0055620 A1* | 2/2015 | Vesterinen | H04W 36/18 370/331 |

FOREIGN PATENT DOCUMENTS

| | | |
|---|---|---|
| CN | 102300259 A | 12/2011 |
| CN | 102843665 A | 12/2012 |
| CN | 102958102 A | 3/2013 |
| CN | 103039109 A | 4/2013 |
| CN | 103404195 A | 11/2013 |
| CN | 103858476 A | 6/2014 |
| EP | 2528281 A1 | 11/2012 |
| WO | 2009/140898 A1 | 11/2009 |

OTHER PUBLICATIONS

"3rd Generation Partnership Project; Technical Specification Group Radio Access Network; Evolved Universal Terrestrial Radio Access (E-UTRA); Radio Link Control (RLC) protocol specification (Release 11)", 3GPP TS 36.322 V11.0.0, Sep. 2012, 39 pages.
"Impact of Carrier Aggregation on the L2 protocol architecture for LTE Rel-10", Ericsson, 3GPP TSG-RAN WG2 #66, May 4-8, 2009, 8 pages, Tdoc R2-092957.

* cited by examiner

*Primary Examiner* — Afshawn Towfighi

(57) ABSTRACT

Embodiments of the present invention provide a data transmission method, device, and system. A first device is configured to serve a primary carrier, and the first device includes: a first unit configured to process an RLC layer, a second unit configured to process a MAC layer, a third unit configured to process a PDCP layer, and a first scheduling unit. The first unit includes a first control module and a first transition module. The second transition module is configured to: receive the N data packets and scheduling information sent by all scheduling units in the system, acquire, according to all or a part of the received scheduling information and from the N data packets a data packet that needs to be transmitted on the secondary carrier, and send the data packet acquired by the second transition module to the fifth unit.

20 Claims, 5 Drawing Sheets

DATA TRANSMISSION METHOD, DEVICE, AND SYSTEM

CROSS REFERENCE TO RELATED APPLICATIONS

This application is a continuation of International Application No. PCT/CN2013/090325 filed on Dec. 24, 2013, which is incorporated herein by references in its entirety.

TECHNICAL FIELD

The present invention relates to the field of mobile communications technologies, and in particular, to a data transmission method, device, and system.

BACKGROUND

Currently, Long Term Evolution (LTE) has been brought into wide commercial use. Carrier Aggregation (CA) technology is introduced in 3GPP R10, and multi-carrier joint scheduling processing is implemented. However, in a data transmission process, real-time transmission from a radio link control (RLC) layer to a Media Access Control (MAC) layer is generally required to be completed within 100 us (microseconds), and therefore relatively high interface bandwidth is required. All currently existing CA solutions are implemented inside a base station, and it is difficult to deploy inter-site CA and inter-board CA because of an interface bandwidth bottleneck.

Specifically, in a case in which inter-site CA deployment cannot be implemented, in an existing CA technology, when transmission of inter-base station data from the radio link control (RLC) layer to the Media Access Control (MAC) layer is limited to be completed within 100 us (microseconds), and a data amount of 4T4R air interfaces at an air interface bandwidth of 20 megahertz is 300 kb (kilobyte), inter-base station interface bandwidth may be calculated as 300 kb/100 us=3 Gbps (Gigabit per second). Generally, data transmission bandwidth that can be provided by an inter-base station interface is 1 Gbps, and the inter-base station interface bandwidth when data is being transmitted is generally greater than 1 Gbps, and therefore inter-site CA deployment cannot be implemented.

In another aspect, despite that all currently existing CA is implemented inside a base station, in an intra-base station and inter-board intra-site CA solution, data is transmitted from a Packet Data Convergence Protocol layer (PDCP) to an RLC layer at a low speed. After scheduling information is received at the RLC layer, the data is transmitted to all MAC layers for at a high speed, and generally the data is limited to be transmitted within 100 us; therefore, a requirement for inter-board interface bandwidth is relatively high. For example, Payload (payload) data is 300 kb, and in an inter-board intra-site CA solution, transmission from the RLC layer to all the MAC layers is limited to be completed within 100 us. Inter-base station interface bandwidth required for transmission from the RLC layer to all the MAC layers is 300 kb/100 us=3 Gbps. Generally, inter-board bandwidth that can be provided for data transmission is 1 Gbps. It can be seen that the inter-board interface bandwidth is greater than the inter-board bandwidth that can be provided for data transmission, and inter-board CA deployment cannot be implemented.

Therefore, it is difficult to implement the CA technology in the prior art because application of the CA technology between devices requires relatively high interface bandwidth.

SUMMARY

Embodiments of the present invention provide a data transmission method, device, and system, which are configured to resolve a problem in which it is difficult to implement a CA technology because relatively high interface bandwidth is required when a CA technology is used between devices.

To achieve the foregoing objective, the following technical solutions are used in the embodiments of the present invention:

According to a first aspect, a data transmission system is provided, and the system includes a first device and a second device, where the first device is configured to serve a primary carrier of user equipment, and the first device includes: a first unit that is configured to process an RLC layer, a second unit that is configured to process a MAC layer, a third unit that is configured to process a PDCP layer, and a first scheduling unit, where the first unit includes a first control module and a first transition module;

the second device is configured to serve a secondary carrier of the user equipment, and the second device includes a fourth unit that is configured to process the RLC layer, a fifth unit that is configured to process the MAC layer, and a second scheduling unit, where the fourth unit includes a second transition module;

the first scheduling unit is configured to send first scheduling information to all transition modules in the system, and the first scheduling information includes scheduling information of the primary carrier;

the second scheduling unit is configured to send second scheduling information to all the transition modules in the system, and the second scheduling information includes scheduling information of the secondary carrier;

the first control module is configured to: receive data from the third unit, group the data into N data packets, and send the N data packets to all the transition modules in the system;

the first transition module is configured to: receive the N data packets and scheduling information sent by all scheduling units in the system, acquire, according to all or a part of the received scheduling information and from the N data packets, a data packet that needs to be transmitted on the primary carrier, and send the data packet acquired by the first transition module to the second unit; and the second transition module is configured to: receive the N data packets and the scheduling information sent by all the scheduling units in the system, acquire, according to all or a part of the received scheduling information and from the N data packets, a data packet that needs to be transmitted on the secondary carrier, and send the data packet acquired by the second transition module to the fifth unit.

According to a second aspect, a data transmission device is provided, where the data transmission device is configured to serve a primary carrier of user equipment, and the data transmission device includes:

a first unit that is configured to process an RLC layer, a second unit that is configured to process a MAC layer, a third unit that is configured to process a PDCP layer, and a first scheduling unit, where the first unit includes a first control module and a first transition module;

the first scheduling unit is configured to send first scheduling information to all transition modules in the data transmission device, where the first scheduling information includes scheduling information of the primary carrier;

the first control module is configured to: receive data from the third unit, group the data into N data packets, and send the N data packets to the first transition module and the second transition module, where the second transition module is included in the first unit or included in another unit outside the transmission device; and the first transition module is configured to: receive the N data packets and scheduling information sent by the first scheduling unit, acquire, according to the received scheduling information and from the N data packets, a data packet that needs to be transmitted on the primary carrier, and send the data packet acquired by the first transition module to the second unit.

According to a third aspect, a data transmission method is provided, where the data transmission method is applied to a data transmission device, where: the data transmission device is configured to serve a primary carrier of user equipment, and the data transmission device includes: a first unit that is configured to process an RLC layer, a second unit that is configured to process a MAC layer, a third unit that is configured to process a PDCP layer, and a first scheduling unit, where the first unit includes a first control module and a first transition module; and the method includes:

sending, by the first scheduling unit, first scheduling information to the first transition module and a second transition module, where the first scheduling information includes scheduling information of the primary carrier, the second transition module is included in the first unit or included in another unit outside the transmission device;

receiving, by the first control module, data from the third unit, grouping the data into N data packets, and sending the N data packets to the first transition module and the second transition module; and receiving, by the first transition module, the N data packets and scheduling information sent by the first scheduling unit, acquiring, according to the received scheduling information and from the N data packets, a data packet that needs to be transmitted on the primary carrier, and sending the data packet acquired by the first transition module to the second unit.

In a first possible implementation manner of the third aspect, the method further includes:

after sending the N data packets, requesting, by the first control module, the first transition module and the second transition module for synchronization with the first control module, and sending a data caching queue status to the first transition module and the second transition module, where the data caching queue status is used to indicate that a quantity of the data packets sent by the first control module is N.

In a first possible implementation manner of the third aspect, a second possible implementation manner of the third aspect is further provided, where the first scheduling information includes information that is used to indicate a quantity M1 of data packets that need to be transmitted on the primary carrier, and the first transition module is specifically configured to acquire the M1 data packets from the N data packets.

In a second possible implementation manner of the third aspect, a third possible implementation manner of the third aspect is further provided, where the first scheduling information further includes a first location or information used to calculate the first location, where the first location is a location of the data packet that needs to be transmitted on the primary carrier in the N data packets; and the first transition module is specifically configured to acquire, from the N data packets, the M1 data packets indicated by the first location.

In a third possible implementation manner of the third aspect, a fourth possible implementation manner of the third aspect is further provided, where the first location includes an initial location of the M1 data packets in the N data packets; and the information used to calculate the first location includes a quantity of data packets that precede the M1 data packets in the N data packets.

In the third and the fourth possible implementation manners of the third aspect, a fifth possible implementation manner of the third aspect is further provided, where the method further includes:

determining, by the first transition module, the first location according to the information used to calculate the first location.

In any one of the first to the fifth possible implementation manners of the third aspect, a sixth possible implementation manner of the third aspect is further provided, where receiving, by the first control module, a completion message from all the transition modules in the data transmission device, and sending a synchronization message as a response to the received completion message, where the completion message is used to indicate that a transition module that sends the completion message has completed receiving of the N data packets of the data, and the synchronization message is used to instruct all the transition modules in the system to complete receiving of the N data packets of the data.

In the sixth possible implementation manner of the third aspect, a seventh possible implementation manner of the third aspect is further provided, where the method further includes:

after learning that the first control module requests for synchronization and receiving the data caching queue status, determining, by the first transition module, whether acquiring of a data packet is completed; and if the acquiring of the data packets is completed, sending the completion message to the first control module, and receiving the synchronization message.

In the third aspect or any one of the foregoing seven possible implementation manners of the third aspect, an eighth possible implementation manner of the third aspect is further provided, where the method further includes:

after receiving the data, determining, by the first control module, whether the data is the same as data sent to all transition modules in the method; and when a result of the determining is yes, grouping the data into N data packets; or after receiving the data, receiving, by the first control module, new data from the third unit and determining whether the new data is the same as data sent to all transition modules in the method; and when a result of the determining is no, waiting until data sent next time is received.

In the sixth possible implementation manner of the third aspect, a ninth possible implementation manner of the third aspect is further provided, where the method further includes:

learning, by the first transition module from the first control module, that the first control module requests for synchronization, and receiving the data caching queue status;

determining, by the first transition module, that a quantity of data packets received by the first transition module is N;

sending, by the first transition module, the completion message to the first control module; and receiving, by the first transition module, the synchronization message from the first control module.

In the ninth possible implementation manner of the third aspect, a tenth possible implementation manner of the third aspect is further provided, where the method further includes:

determining, by the first transition module, that a quantity of data packets cached in the first transition module does not reach N; and continuing to receive, by the first transition module, the data from the first control module until it is determined that the quantity of data packets received by the first transition module is N.

In the third aspect or any one of the foregoing ten possible implementation manners of the third aspect, an eleventh possible implementation manner of the third aspect is further provided, where the data transmission device is a base station or a backplane in a base station.

Embodiments of the present invention provide a data transmission method, device, and system. A first control module and a first transition module are disposed in a first unit and a second transition module is disposed in a fourth unit; in this case, a third unit sends data to the first control module, the first control module sends the data to the first transition module and the second transition module, then the first transition module acquires, from the data, a data packet that is transmitted on a primary carrier and sends the data packet to a second unit, and then the second transition module acquires, from the data, a data packet that is transmitted on a secondary carrier and sends the data packet to a fifth unit. It can be seen from the entire data transmission process that a process in which the first transition module sends a data packet to the second unit is also a process in which the data packet is transmitted from an RLC layer of the first device to a MAC layer of the first device, and the process is not limited by inter-board interface bandwidth; and a process in which the second transition module sends a data packet to the fifth unit is also a process in which the data packet is transmitted from an RLC layer of the second device to a MAC layer of the second device, and the process is not limited by inter-device interface bandwidth, which avoids a limitation imposed by the inter-device interface bandwidth. However, in the prior art, a process in which data is transmitted from the third unit to the fifth unit, namely, a process in which a data packet is transmitted from the RLC layer of the first device to the MAC layer of the second device, is limited by the inter-device interface bandwidth. It can be seen that an inter-device CA technology can be implemented by using the embodiments of the present invention.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To facilitate understanding of embodiments of the present invention, the following describes the present invention in detail with reference to the accompanying drawings and the embodiments.

Figure 1:
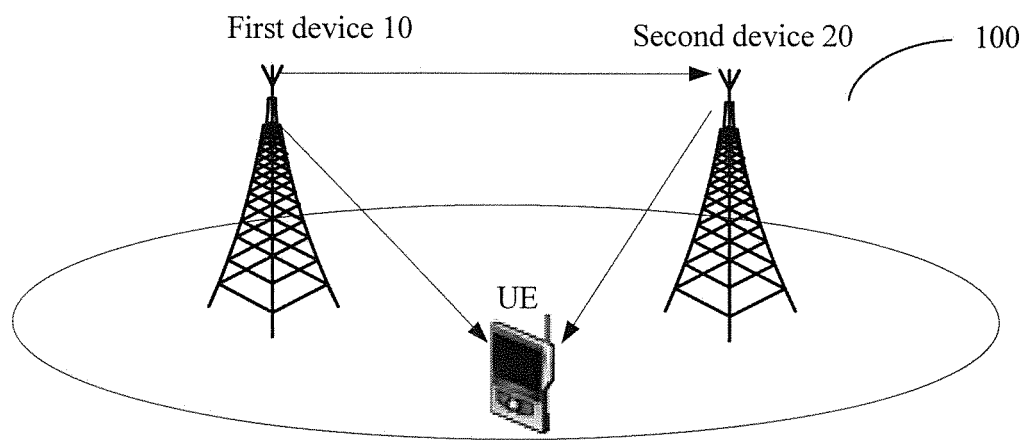
FIG. 1 shows a data transmission system according to an embodiment of the present invention.

As shown in FIG. 1, an embodiment of the present invention provides a data transmission system 100, and the system includes a first device 10 and a second device 20. As shown in FIG. 1, a user uses user equipment (UE) to communicate with all base stations, so as to receive required data. The first device 10 may be a first base station, the second device 20 may be a second base station, the first base station sends data required by the user to the UE, and the second base station acquires the data from the first base station and sends the data required by the user to the UE. The first device 10 and the second device 20 may simultaneously send same data to the UE, so as to implement CA.

Figure 2:
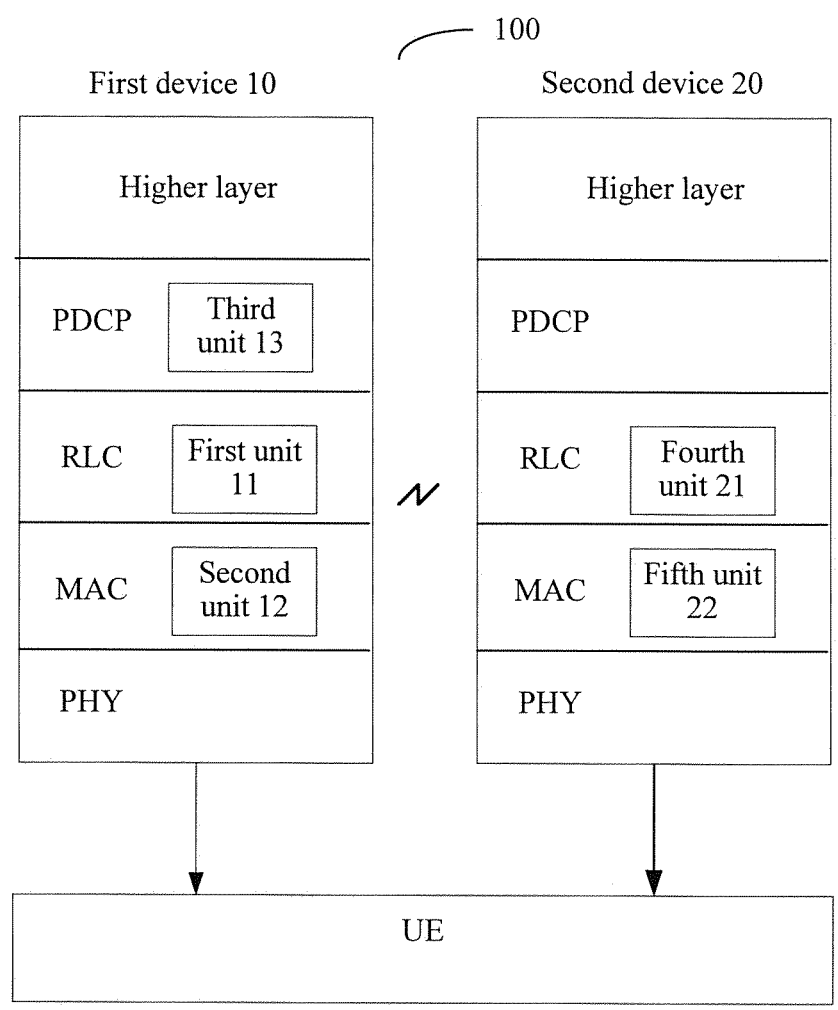
FIG. 2 shows another data transmission system according to an embodiment of the present invention.

An embodiment of the present invention describes the data transmission system 100 in more detail, and as shown in FIG. 2, the first device 10 and the second device 20 included by the system may serve same UE, and a protocol stack separately included by each are similar. For example, the first device 10 serves a primary carrier of the UE, and the first device includes: a physical (PHY) layer, an RLC layer that is above the PHY layer, a PDCP layer that is above the RLC layer, and a higher layer that is above the PDCP layer, a first unit 11 that is configured to process the RLC layer, a second unit 12 that is configured to process the MAC layer, and a third unit 13 that is configured to process the PDCP layer, where the third unit 13 acquires data from the higher layer.

The second device 20 is configured to serve a secondary carrier of the UE, and the second device 20 includes: a PHY physical layer, an RLC layer that is above the PHY layer, a PDCP layer that is above the RLC layer, a higher layer that is above the PDCP layer, a fourth unit 21 that is configured to process the RLC layer, and a fifth unit 22 that is configured to process the MAC layer.

It should be noted that the first device 10 and the second device 20 may be two base stations or may be two backplanes in a base station.

Figure 3:
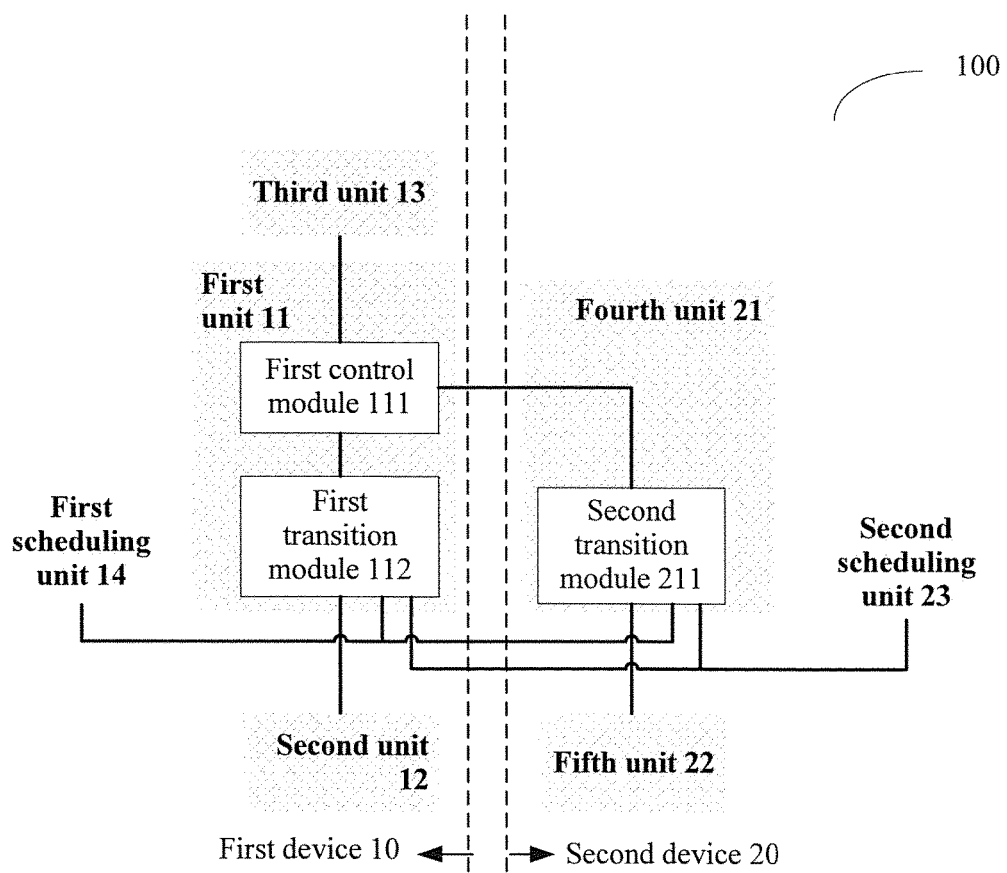
FIG. 3 shows still another data transmission system according to an embodiment of the present invention.

As shown in FIG. 3, optionally, the first unit 11 includes a first control module 111 and a first transition module 112; the fourth unit 21 includes a second transition module 211.

Optionally, the first device 10 further includes a first scheduling unit 14, where the first scheduling unit 14 is configured to send first scheduling information to all transition modules in the system, and the first scheduling information includes scheduling information of the primary carrier; and the second device 20 further includes a second scheduling unit 23, where the second scheduling unit 23 is configured to send second scheduling information to all the transition modules in the system, and the second scheduling information includes scheduling information of the secondary carrier.

In this embodiment of the present invention, the first scheduling unit 14 is disposed for the first transition module 112, and the second scheduling unit 23 is disposed for the second transition module 211, which ensures that all transition modules can quickly acquire the scheduling information, so as to quickly acquire a data packet transmitted on a carrier.

In the data transmission system 100, the first control module 111 receives data from the third unit 13, groups the data into N data packets, and sends the N data packets to all the transition modules in the system.

The first transition module 112 receives the N data packets and scheduling information sent by all scheduling units in the system, acquires, according to all or a part of the received scheduling information and from the N data packets, a data packet that needs to be transmitted on the primary carrier, and sends the data packet acquired by the first transition module 112 to the second unit 12.

The second transition module 211 receives the N data packets and the scheduling information sent by all the scheduling units in the system, acquires, according to all or a part of the received scheduling information and from the N data packets, a data packet that needs to be transmitted on the secondary carrier, and sends the data packet acquired by the second transition module to the fifth unit 22.

Figure 4:
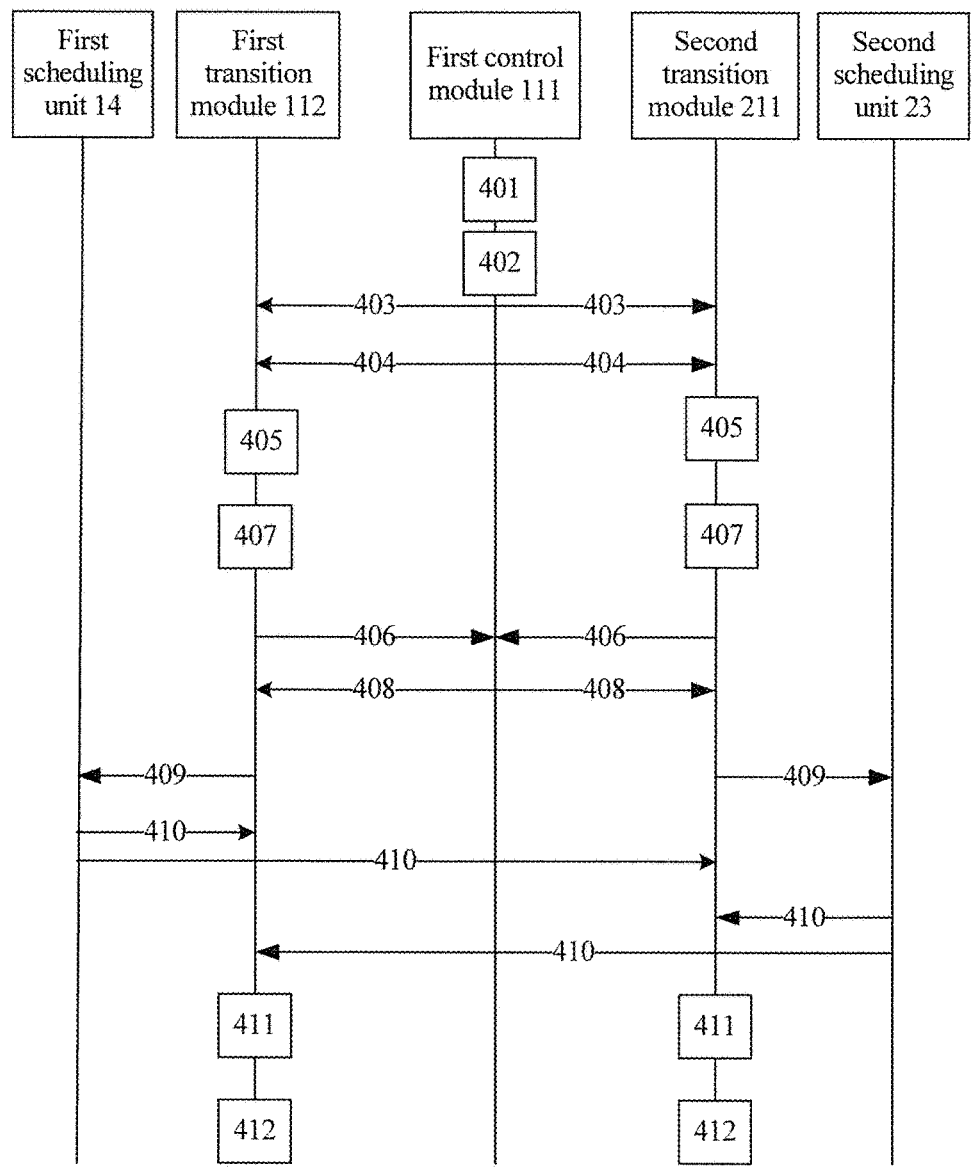
FIG. 4 shows a data transmission method according to an embodiment of the present invention.

For a more detailed understanding of a process in which the data transmission system uses the CA technology to transmit data to a user, as shown in FIG. 4, a data transmission method is provided. The method includes the following steps 401 to 412:

401. The first control module 111 receives data from the third unit 13.

402. After receiving the data, the first control module 111 determines whether the data is the same as data sent to all transition modules; and when a result of the determining is yes, groups the data into N data packets; or after receiving the data, the first control module receives new data from the third unit and determines whether the new data is the same as data sent to all transition modules in the method; and when a result of the determining is no, waits until data sent next time is received.

Step 402 ensures that data sent to all the transition modules each time is updated data.

403. The first control module 111 sends the N data packets to the first transition module 112 and the second transition module 211.

404. After sending the N data packets, the first control module 111 requests the first transition module 112 and the second transition module 211 for synchronization with the first control module 111, and sends a data caching queue status to the first transition module 112 and the second transition module 211, where the data caching queue status is used to indicate that a quantity of the data packets sent by the first control module 111 is N.

405. The first transition module 112 learns, from the first control module 111, that the first control module requests for synchronization, and receives the data caching queue status.

The second transition module 211 learns, from the first control module 111, that the first control module requests for synchronization, and receives the data caching queue status.

After step 405, the first transition module 112 determines whether a quantity of the data packets received by the first transition module 112 is N. If a result of the determining is yes, 406 is performed; or if a result of the determining is no, 407 is performed.

The second transition module 211 determines whether a quantity of the data packets received by the second transition module 211 is N. If a result of the determining is yes, 406 is performed; or if a result of the determining is no, 407 is performed.

406. The first transition module 112 sends the completion message to the first control module 111; and the second transition module 211 sends the completion message to the first control module 111.

407. The first transition module 112 continues to receive the data from the first control module 111 until it is determined that a quantity of data packets received by the first transition module 112 is N, and sends the completion message to the first control module 111.

The second transition module 211 continues to receive the data from the first control module 111 until it is determined that a quantity of data packets received by the second transition module 211 is N, and sends the completion message to the first control module 111.

After the first transition module 112 and the second transition module 211 send the synchronization message to the first control module 111, the foregoing step 408 is performed.

408. The first control module 111 sends the synchronization message to the first transition module 112 and the second transition module 211 as a response to the received completion message.

By using the foregoing steps, the first transition module 112 and the second transition module 211 complete receiving of the N data packets. After the first transition module 112 receives the N data packets, steps 409 to 412 are mainly used to implement acquiring of a data packet transmitted on a carrier.

409. The first transition module 112 sends a scheduling request to the first scheduling unit 14.

The second transition module 211 sends a scheduling request to the second scheduling unit 23.

In all embodiments of the present invention, different scheduling units may be disposed for each transition module, or all transition modules share one scheduling unit. When the two manners are compared, configuring a scheduling module for each transition module can ensure fast implementation of a process of acquiring scheduling information, and therefore ensures that all transition modules concurrently start, by using the scheduling information, a process of acquiring the data packets transmitted on the carrier.

410. The first scheduling unit 14 sends first scheduling information to the first transition module 112 and/or the second transition module 211 in the data transmission device.

The second scheduling unit 23 sends second scheduling information to the second transition module 211 and/or the first transition module 112.

411. The first transition module 112 acquires M1 data packets from the N data packets; and the second transition module 211 acquires M2 data packets from the N data packets.

That the first transition module 112 acquires the M1 data packets from the N data packets may be completed by using the following implementation manner 1 and implementation manner 2.

Implementation manner 1: In a case in which the first scheduling information includes information that is used to indicate a quantity M1 of data packets that need to be transmitted on the primary carrier, the first transition module 112 acquires the M1 data packets from the N data packets.

Implementation manner 2: The first scheduling information includes a first location or information used to calculate the first location, where the first location is a location of the data packet that needs to be transmitted on the primary carrier in the N data packets.

The first transition module 112 acquires, from the N data packets, the M1 data packets indicated by the first location. In this way, the first transition module 112 may directly find, according to the first location, the M1 data packets from the N data packets.

Optionally, the first location includes an initial location of the M1 data packets in the N data packets. The information used to calculate the first location includes a quantity of data packets that precede the M1 data packets in the N data packets.

The first transition module 112 determines the first location according to the information used to calculate the first location.

For example, the first transition module 112 acquires a total quantity of data packets in scheduling information corresponding to all the transition modules that precede M1 data blocks required by the first transition module 112, and acquires the M1 data packets starting from a first data packet after the data packets of the total quantity. Specifically, if M2 data packets required by the second transition module precede the M1 data packets required by the first transition module 112, the first transition module 112 calculates the initial location as M2+1 according to the second scheduling information and acquires the M1 data packets according to the first scheduling information. If the M1 data packets required by the first transition module 112 precede M2 data packets required by the second transition module, the first transition module 112 acquires, according to the first scheduling information, the M1 data packets starting from a first data packet of the N data packets.

In all the embodiments of the present invention, for each transition module, in a case in which information such as storage information is used to determine that a data block required by the transition module itself precedes another transition module, only scheduling information related to the transition module itself needs to be acquired in a scheduling information acquiring process, and no other scheduling information needs to be acquired.

That the second transition module 211 acquires the M2 data packets from the N data packets may be specifically completed by using the following implementation manner 1 and implementation manner 2.

Implementation manner 1: In a case in which the second scheduling information includes information that is used to indicate a quantity M2 of data packets that need to be transmitted on the secondary carrier, the second transition module 211 acquires the M2 data packets from the N data packets.

Implementation manner 2: The second scheduling information includes a second location or information used to calculate the second location, where the second location is a location of the data packet that needs to be transmitted on the secondary carrier in the N data packets, and the second transition module is specifically configured to acquire, from the N data packets, the M2 data packets indicated by the second location. In this way, the second transition module may directly find, according to the second location, the M2 data packets from the N data packets.

Preferably, the second location includes an initial location of the M2 data packets in N data packets; and the information used to calculate the second location includes a quantity of data packets that precede the M2 data packets in the N data packets.

The second transition module 211 determines the second location according to the information used to calculate the second location.

412. The first transition module 112 sends the acquired M1 data packets to the second unit 12; and the second transition module 211 sends the acquired M2 data packets to the fifth unit 22.

Figure 5:
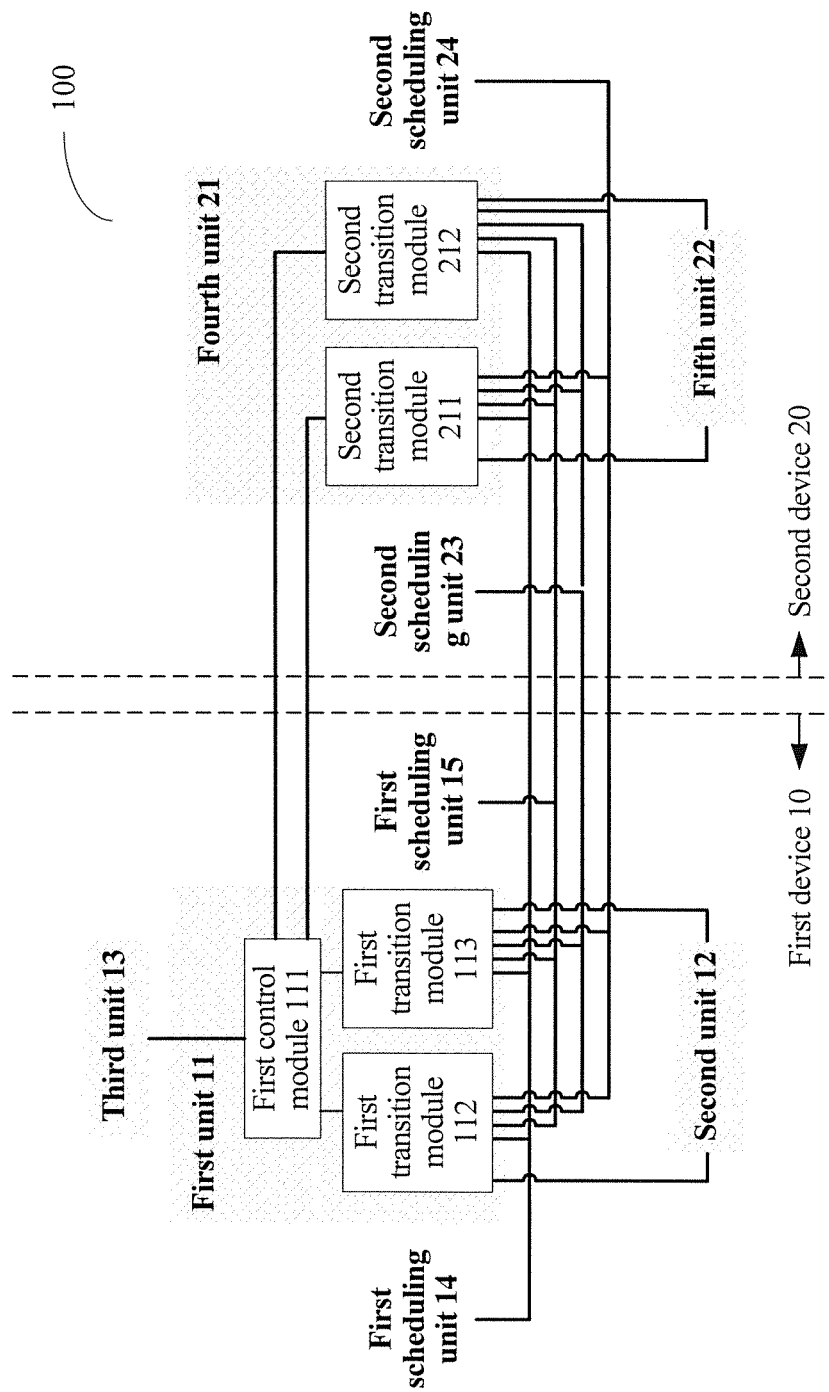
FIG. 5 shows yet another data transmission system according to an embodiment of the present invention.

Optionally, multiple first transition modules may be disposed in the first device 10 of the data transmission system of the present invention, and multiple second transition modules may be disposed in the second device 20. As shown in FIG. 5, a first transition module 113 is further disposed in the first unit 11, and a second transition module 212 is further disposed in the fourth unit 21.

Correspondingly, after the first transition module 113 and the second transition module 212 are added, a process which the first control module goes through differs from the process described in the foregoing embodiments in the following:

in step 403, the first control module 111 sends the N data packets to the first transition module 112, the second transition module 211, the first transition module 113, and the second transition module 212.

In the foregoing step 404, the first control module 111 requests the first transition module 112, the second transition module 211, the first transition module 113, and the second transition module 212 for synchronization with the first control module 111, and sends a data caching queue status to the first transition module 112, the second transition module 211, the first transition module 113, and the second transition module 212, where the data caching queue status is used to indicate that a quantity of the data packets sent by the first control module 111 is N.

The foregoing step 405 further includes: learning, by the first transition module 113 from the first control module 111, that the first control module requests for synchronization, and receiving the data caching queue status; and learning, by the second transition module 212 from the first control module 111, that the first control module requests for synchronization, and receiving the data caching queue status.

After step 405, the first transition module 113 determines whether a quantity of the data packets received by the first transition module 113 is N. If a result of the determining is yes, 406 is performed; or if a result of the determining is no, 407 is performed. The second transition module 212 determines whether a quantity of the data packets received by the second transition module 212 is N. If a result of the determining is yes, 406 is performed; or if a result of the determining is no, 407 is performed.

The foregoing step 406 further includes: sending, by the first transition module 113, the completion message to the first control module 111; and sending, by the second transition module 212, the completion message to the first control module 111.

The foregoing step 407 further includes: continuing to receive, by the first transition module 113, the data from the first control module 111 until it is determined that a quantity of data packets received by the first transition module 113 is N, and sending the completion message to the first control module 111; and continuing to receive, by the second transition module 212, the data from the first control module 111 until it is determined that a quantity of data packets received by the second transition module 212 is N, and sending the completion message to the first control module 111.

In the foregoing step 408, the first control module 111 sends a synchronization message to the first transition module 112, the second transition module 211, the first transition module 113, and the second transition module 212 as a response to the received completion message.

By using the foregoing steps, the first transition module 113 and the second transition module 212 implement receiving of the N data packets.

The foregoing step 409 further includes: sending, by the first transition module 113, a scheduling request to the first scheduling unit 15; and sending, by the second transition module 212, a scheduling request to the second scheduling unit 24.

In the foregoing step 410, the first scheduling unit 14 sends the first scheduling information to the first transition module 112, the first transition module 113, the second transition module 211, and the second transition module 212.

The first scheduling unit 15 sends the first scheduling information to the first transition module 112, the first transition module 113, the second transition module 211, and the second transition module 212.

The second scheduling unit 23 sends the first scheduling information and sends the second scheduling information to the first transition module 112, the first transition module 113, the second transition module 211, and the second transition module 212.

The second scheduling unit 24 sends the first scheduling information and sends the second scheduling information to the first transition module 112, the first transition module 113, the second transition module 211, and the second transition module 212.

The first transition module 113 and the second transition module 212 complete, by using the scheduling information, acquiring of a data packet transmitted on a carrier. A process is the same as that of the first transition module 112 and the second transition module 211, and details are not described herein again.

Compared with a case in the prior art in which data is sent, in serial, to each MAC layer, it can be seen that the first transition module 112 and the first transition module 113 are disposed in the first device 10 and the second transition module 211 and the second transition module 212 are disposed in the second device 20, so that data transmitted on a carrier may be simultaneously distributed to four transition modules for transmission, and interface bandwidth can be effectively reduced by using this embodiment of the present invention. For example, in the prior art, if an RLC layer sends, in serial, sub-data of 50 kb to two MAC layers, a time for the sending needs to be limited to 100 us, a time for sending the sub-data to either MAC layer is 50 us, and interface bandwidth is 50 kb/50 us=1 Gbps; however, in the present invention, data at the RLC layer is first distributed to four transition modules, so that sub-data transmitted by each transition module is 25 kb, and a time required for concurrently sending the data to the MAC layers is still 100 us, so that the interface bandwidth is 25 kb/100 us=0.25 Gbps. Therefore, it can be seen that the interface bandwidth is reduced.

According to the data transmission method provided in this embodiment of the present invention, a first control module and a first transition module are disposed in a first unit, and a second transition module is disposed in a fourth unit. It can be seen from the entire data transmission process that a process in which the first transition module sends a data packet to the second unit is also a process in which the data packet is transmitted from an RLC layer of the first device to a MAC layer of the first device, and the process is not limited by inter-board interface bandwidth; and a process in which the second transition module sends a data packet to the fifth unit is also a process in which the data packet is transmitted from an RLC layer of the second device to a MAC layer of the second device, and the process is not limited by inter-device interface bandwidth, which avoids a limitation imposed by the inter-device interface bandwidth. However, in the prior art, a process in which data is transmitted from the third unit to the fifth unit, namely, a process in which a data packet is transmitted from the RLC layer of the first device to the MAC layer of the second device, is limited by the inter-device interface bandwidth. It can be seen that an inter-device CA technology can be implemented by using this embodiment of the present invention.

Embodiment 2

An embodiment of the present invention provides a data transmission system 100. As shown in FIG. 3, the system 10 includes a first device 10 and a second device 20.

The first device 10 is configured to serve a primary carrier of UE, and the first device includes: a first unit 11 that is configured to process an RLC layer, a second unit 12 that is configured to process a MAC layer, and a third unit 13 that is configured to process a PDCP layer, where the first unit 11 includes a first control module 111 and a first transition module 112.

The second device 20 is configured to serve a secondary carrier of the UE, and the second device 20 includes a fourth unit 21 that is configured to process the RLC layer and a fifth unit 22 that is configured to process the MAC layer, where the fourth unit 21 includes a second transition module 211.

The first control module 111 is configured to: receive data from the third unit 15, group the data into N data packets, and send the N data packets to all the transition modules in the system.

The first transition module 112 is configured to: receive the N data packets, acquire, from the N data packets, a data packet that needs to be transmitted on the primary carrier, and send the data packet acquired by the first transition module 112 to the second unit 12.

The second transition module 211 is configured to: receive the N data packets, acquire, from the N data packets, a data packet that needs to be transmitted on the secondary carrier, and send the data packet acquired by the second transition module 211 to the fifth unit 22.

Optionally, the first control module 111 is further configured to:

after receiving the data, determine whether the data is the same as data sent to all the transition modules in the system, and when a result of the determining is yes, group the data into N data packets; or after receiving the data, receive new data from the third unit and determine whether the new data is the same as data sent to all the transition modules in the system, and when a result of the determining is no, wait until data sent next time is received. In this way, it is ensured that data sent to all the transition modules each time is updated data.

Optionally, the first device 10 further includes a first scheduling unit 14, where the first scheduling unit 14 is configured to send first scheduling information to all the transition modules in the system, and the first scheduling information includes scheduling information of the primary carrier.

Preferably, the first transition module 112 is further configured to receive scheduling information sent by all scheduling units in the system.

The first transition module 112 is specifically configured to acquire, according to all or a part of the received scheduling information and from the N data packets, the data packet that needs to be transmitted on the primary carrier.

In this way, the first transition module 112 receives the scheduling information of all the scheduling units and acquires, according to all or a part of the scheduling information, the data packet that needs to be transmitted on the primary carrier, so as to send the acquired data packet to the second unit 12. It can be seen from the entire data transmission process that a process in which the first transition module sends a data packet to the second unit is also a process in which the data packet is transmitted from an RLC layer of the first device to a MAC layer of the first device. The process is not limited by inter-board interface bandwidth, and generally, relatively high data transmission bandwidth can be provided in a board by using an intra-board interface.

Optionally, the second device 20 further includes a second scheduling unit 23, where the second scheduling unit 23 is configured to send second scheduling information to all the transition modules in the system, and the second scheduling information includes scheduling information of the secondary carrier.

Preferably, the second transition module 211 is further configured to receive the scheduling information sent by all the scheduling units in the system.

The second transition module 211 is specifically configured to acquire, according to all or a part of the received scheduling information and from the N data packets, the data packet that needs to be transmitted on the secondary carrier.

In this way, the second transition module 211 receives the scheduling information of all the scheduling units and acquires, according to all or a part of the scheduling information, the data packet that needs to be transmitted on the secondary carrier, so as to send the acquired data packet to the fifth unit 22. It can be seen from the entire data transmission process that a process in which the second transition module sends a data packet to the fifth unit is also a process in which the data packet is transmitted from an RLC layer of the second device to a MAC layer of the second device, which avoids limitation imposed by the inter-device interface bandwidth. However, in the prior art, a process in which data is transmitted from the third unit to the fifth unit, namely, a process in which a data packet is transmitted from the RLC layer of the first device to the MAC layer of the second device, is limited by the inter-device interface bandwidth.

Optionally, the first control module 111 is further configured to:

after sending the N data packets, request all the transition modules in the system for synchronization with the first control module, and send a data caching queue status to all the transition modules in the system, where the data caching queue status is used to indicate that a quantity of the data packets sent by the first control module is N.

In this embodiment of the present invention, the first control module synchronizes with all the transition modules, which ensures that all the transition modules receive all data packets of currently transmitted time, so that each transition module can acquire a data packet transmitted on a carrier.

Correspondingly, the first transition module 112 and/or the second transition module 211 are/is further configured to:

after learning that the first control module requests for synchronization and receiving the data caching queue status, determine whether acquiring of the N data packets is completed, and if the acquiring of the data packets is completed, send a completion message to the first control module, where the completion message is used to indicate that a transition module that sends the completion message has completed receiving of the N data packets of the data, and the synchronization message is used to instruct all the transition modules in the system to complete receiving of the N data packets of the data; or if the acquiring of the data packets is not completed, continue to receive the data from the first control module until it is determined that the quantity of data packets received by the first transition module 112 and/or the second transition module 211 are/is N.

Optionally, the first control module is further configured to:

receive a completion message from all the transition modules in the system, and send a synchronization message as a response to the received completion message, where the synchronization message is used to instruct all the transition modules in the system to complete receiving of the N data packets of the data.

In the present invention, after all the transition modules send the completion message, the first control module 111 sends a synchronization message to all the transition modules, so as to implement that all the transition modules simultaneously acquire, from the N data packets, the data packet transmitted on the carrier, so that all the transition modules can send the data packet to each MAC layer.

In this way, by receiving the completion message, the first control module determines that all the transition modules in the system receive the N data packets of the data, which implements synchronization of receiving the data, so that all transition modules may acquire the data packet transmitted on the carrier, which indicates that a packet assembly process in which the first transition module 112 acquires M1 data packets and the second transition module 211 acquires M2 data packets starts.

In this embodiment of the present invention, all the transition modules are synchronized with the first control module, which ensures that all the transition modules acquire all the data, and at the same time, the process of acquiring the data packet transmitted on the carrier starts, so that all the transition modules can concurrently send data to each MAC layer. Compared with a case in the prior art in which data is sent, in serial, to each MAC layer, this embodiment of the present invention can effectively reduce interface bandwidth. For example, in the prior art, if an RLC layer sends, in serial, sub-data of 50 kb to two MAC layers and a time for the sending needs to be limited to 100 us, a time for sending the sub-data to either MAC layer is 50 us, and interface bandwidth is 50 kb/50 us=1 Gbps; however, in the present invention, data at the RLC layer is first distributed to two transition modules, so that sub-data transmitted by each transition module is 50 kb, and a time required for concurrently sending the data to the MAC layers is still 100 us, so that the interface bandwidth is 50 kb/100 us=0.5 Gbps. Therefore, it can be seen that the interface bandwidth is reduced.

Optionally, the first transition module 112 and/or the second transition module 211 are/is further configured to, after receiving the synchronization message, start to complete, according to all or a part of the scheduling information, acquiring of a data packet.

Specifically, a process in which the acquiring of the data packet is completed according to all or a part of the scheduling information is implemented as follows:

The first scheduling information includes information that is used to indicate a quantity M1 of data packets that need to be transmitted on the primary carrier, and the first transition module 112 is specifically configured to acquire the M1 data packets from the N data packets.

The second scheduling information includes information that is used to indicate a quantity M2 of data packets that need to be transmitted on the secondary carrier, and the second transition module 211 is specifically configured to acquire the M2 data packets from the N data packets.

Optionally, the first scheduling information further includes a first location or information used to calculate the first location, where the first location is a location of the data packet that needs to be transmitted on the primary carrier in the N data packets; and the first transition module 112 is specifically configured to acquire, from the N data packets, the M1 data packets indicated by the first location.

The second scheduling information further includes a second location or information used to calculate the second location, where the second location is a location of the data packet that needs to be transmitted on the secondary carrier in the N data packets, and the second transition module 211 is specifically configured to acquire, from the N data packets, the M2 data packets indicated by the second location.

Optionally, the first location includes an initial location of the M1 data packets in the N data packets.

The information used to calculate the first location includes a quantity of data packets that precede the M1 data packets in the N data packets.

The second location includes an initial location of the M2 data packets in N data packets.

The information used to calculate the second location includes a quantity of data packets that precede the M2 data packets in the N data packets.

Optionally, the first transition module 112 is further configured to determine the first location according to the information used to calculate the first location, and the second transition module 211 is further configured to determine the second location according to the information used to calculate the second location.

The following implementation method may be used: The first transition module acquires a total quantity of data packets in scheduling information corresponding to all the transition modules that precede M1 data blocks required by the first transition module, and acquires the M1 data packets starting from a first data packet after the data packets of the total quantity.

For example, if M2 data packets required by the second transition module precede the M1 data packets required by the first transition module, the first transition module calculates the initial location as M2+1 according to the second scheduling information and acquires the M1 data packets according to the first scheduling information.

For example, if the M1 data packets required by the first transition module precede the M2 data packets required by the second transition module, the first transition module acquires, according to the first scheduling information, the M1 data packets starting from a first data packet of the N data packets.

A process in which the second transition module acquires the M2 data packets from the N data packets is the same as a process in which the first transition module acquires the M1 data packets, and details are not described herein again.

Preferably, the first device is a first base station, and the second device is a second base station; or the first device and the second device are different backplanes in a base station.

According to the data transmission system provided in this embodiment of the present invention, a third unit sends data to a first control module, the first control module sends the data to a second transition module, and then the second transition module acquires, from the data, a data packet transmitted on a secondary carrier, and sends the data packet to a fifth unit. A process in which the second transition module sends the data packet to the fifth unit is also a process in which the data packets is transmitted from an RLC layer of the second device to a MAC layer of the second device. The process is not limited by inter-device interface bandwidth, which avoids a limitation imposed by the inter-device interface bandwidth. However, in the prior art, a process in which data is transmitted from the third unit to the fifth unit, which is also a process in which a data packet is transmitted from an RLC layer of the first device to a MAC layer of the second device, is limited by the inter-device interface bandwidth. It can be seen that an inter-device CA technology can be implemented by using this embodiment of the present invention.

Embodiment 3

An embodiment of the present invention provides a data transmission device, for example, the foregoing first device 10, as shown in FIG. 3. Optionally, the data transmission device 10 is a base station or a backplane in a base station.

The data transmission device 10 is configured to serve a primary carrier of UE, and the data transmission device 10 includes: a first unit 11 that is configured to process an RLC layer, a second unit 12 that is configured to process a MAC layer, and a third unit 13 and a first scheduling unit 14 that are configured to process a PDCP layer, where the first unit 11 includes a first control module 111 and a first transition module 112.

The first scheduling unit 14 is configured to send first scheduling information to all transition modules in the data transmission device, where the first scheduling information includes scheduling information of the primary carrier.

The first control module 111 is configured to: receive data from the third unit, group the data into N data packets, and send the N data packets to the first transition module 112 and a second transition module, where the second transition module is included in the first unit (for example, a first transition module 113) or included in another unit (for example, a second transition module 211) outside the transmission device.

The first transition module 112 is configured to: receive the N data packets and scheduling information sent by the first scheduling unit, acquire, according to the received scheduling information and from the N data packets, a data packet that needs to be transmitted on the primary carrier, and send the data packet acquired by the first transition module 112 to the second unit.

An embodiment of the present invention provides a data transmission device, which implements a process in which the first transition module sends a data packet to the second unit, which is also a process in which the data packet is transmitted from an RLC layer of the first device to a MAC layer of the first device. The process is implemented in a board, data transmission bandwidth provided in the board is relatively high, and therefore data transmission is not limited by inter-board interface bandwidth.

Optionally, the first control module 111 is further configured to:

after receiving the data, determine whether the data is the same as data sent to all the transition modules in the data transmission device, and when a result of the determining is yes, group the data into N data packets; or after receiving the data, receive new data from the third unit and determine whether the new data is the same as data sent to all the transition modules in the data transmission device, and when a result of the determining is no, wait until data sent next time is received. In this way, by means of determining, by the first control module, the data sent to the first transition module each time, it is ensured that data sent to all the transition modules each time is updated data.

Optionally, the first control module 111 is further configured to:

after sending the N data packets, request the first transition module 112 and the second transition module for synchronization with the first control module, and send a data caching queue status to the first transition module 112 and the second transition module, where the data caching queue status is used to indicate that a quantity of the data packets sent by the first control module is N.

In this embodiment of the present invention, the first control module initiates synchronization, and all transition modules work with the first control module to perform the synchronization, which ensures that the first transition module completes receiving of the data, so as to subsequently perform a process of acquiring a data packet transmitted on a carrier.

Optionally, the first control module 111 is specifically configured to:

receive a completion message from all the transition modules in the data transmission device, and send a synchronization message as a response to the received completion message, where the completion message is used to indicate that a transition module that sends the completion message has completed receiving of the N data packets of the data, and the synchronization message is used to instruct all the transition modules in the system to complete receiving of the N data packets of the data.

Correspondingly, the first transition module 112 is further configured to:

after learning that the first control module requests for synchronization and receiving the data caching queue status, determine whether acquiring of a data packet is completed; and if the acquiring of the data packets is completed, send a completion message to the first control module, and receive the synchronization message.

Correspondingly, the first transition module 112 is further configured to:

learn, from the first control module, that the first control module requests for synchronization, and receive the data caching queue status;

determine that a quantity of data packets received by the first transition module 112 is N;

send the completion message to the first control module; and receive the synchronization message from the first control module.

Optionally, the first transition module 112 is further configured to:

determine that a quantity of data packets cached in the first transition module 112 does not reach N; and continue to receive the data from the first control module until it is determined that the quantity of data packets received by the first transition module 112 is N.

In this embodiment of the present invention, the first control module synchronizes with all the transition modules, which ensures that all the transition modules receive all data packets of currently transmitted data, so that the first transition module can acquire, according to all or a part of the scheduling information, a data packet transmitted on a carrier.

Preferably, the first scheduling information includes: information used to indicate a quantity M1 of data packets that need to be transmitted on the primary carrier. Correspondingly, the first transition module 112 is specifically configured to acquire the M1 data packets from the N data packets.

Optionally, the first scheduling information further includes a first location or information used to calculate the first location, where the first location is a location of the data packet that needs to be transmitted on the primary carrier in the N data packets, and the first transition module 112 is specifically configured to acquire, from the N data packets, the M1 data packets indicated by the first location. In this way, the first transition module 112 may directly find, according to the first location, the M1 data packets from the N data packets.

Optionally, the first location includes an initial location of the M1 data packets in the N data packets. The information used to calculate the first location includes a quantity of data packets that precede the M1 data packets in the N data packets. The first transition module 112 is further configured to determine the first location according to the information used to calculate the first location.

For example, the first transition module 112 acquires a total quantity of data packets in scheduling information corresponding to all the transition modules that precede M1 data blocks required by the first transition module 112, and acquires the M1 data packets starting from a first data packet after the data packets of the total quantity. Specifically, if M2 data packets required by the second transition module precede the M1 data packets required by the first transition module 112, the first transition module 112 calculates the initial location as M2+1 according to the second scheduling information and acquires the M1 data packets according to the first scheduling information. If the M1 data packets required by the first transition module 112 precede M2 data packets required by the second transition module, the first transition module 112 acquires, according to the first scheduling information, the M1 data packets starting from a first data packet of the N data packets.

According to the data transmission device provided in this embodiment of the present invention, a first control module and a first transition module are disposed in a first unit, and in this case, a third unit sends data to the first control module, the first control module sends the data to the first transition module, and then the first transition module acquires, from the data, a data packet transmitted on a primary carrier and send the data packet to a second unit. The first transition module implements receiving of all data sent by the first control module. The first control module initiates synchronization, so as to ensure that the first transition module completes the receiving of the data. After completing the receiving of the data, the first transition module acquires, according to the scheduling information, the data packet transmitted on the primary carrier, and sends the acquired data packet transmitted on the primary carrier to the second unit, so as to implement data transmission from an RLC layer to a MAC layer. An entire transmission process in this embodiment of the present invention is not limited by inter-board interface bandwidth.

The foregoing embodiments may be combined and referenced mutually. For ease and brevity of description, details are not described herein again.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission system, comprising:
a first device configured to serve a primary carrier of user equipment, and the first device comprises:
  a first unit configured to process a radio link control (RLC) layer, the first unit comprising a first control module and a first transition module,
  a second unit configured to process a Media Access Control (MAC) layer,
  a third unit configured to process a Packet Data Convergence Protocol (PDCP) layer, and
  a first scheduling unit;
a second device configured to serve a secondary carrier of the user equipment, and the second device comprises:
  a fourth unit configured to process the RLC layer, the fourth unit comprising a second transition module,
  a fifth unit configured to process the MAC layer, and
  a second scheduling unit; and
wherein:
  the first scheduling unit is configured to send first scheduling information to all transition modules in the system, and the first scheduling information comprises scheduling information of the primary carrier,
  the second scheduling unit is configured to send second scheduling information to all the transition modules in the system, and the second scheduling information comprises scheduling information of the secondary carrier,
  the first control module is configured to: receive data from the third unit, group the data into N data packets, and send the N data packets to all the transition modules in the system,
  the first transition module is configured to: receive the N data packets and scheduling information sent by all scheduling units in the system, acquire, according to all or a part of the received scheduling information and from the N data packets, a data packet that needs to be transmitted on the primary carrier, and send the data packet acquired by the first transition module to the second unit, and
  the second transition module is configured to: receive the N data packets and the scheduling information sent by all the scheduling units in the system, acquire, according to all or a part of the received scheduling information and from the N data packets, a data packet that needs to be transmitted on the secondary carrier, and send the data packet acquired by the second transition module to the fifth unit.

2. The system according to claim 1, wherein the first control module is further configured to:
after sending the N data packets, request all the transition modules in the system for synchronization with the first control module, and send a data caching queue status to all the transition modules in the system, wherein the data caching queue status is used to indicate that a quantity of the data packet sent by the first control module is N.

3. The system according to claim 2, wherein:
the first scheduling information comprises information used to indicate a quantity M1 of data packets that need to be transmitted on the primary carrier;
the first transition module is configured to acquire the M1 data packets from the N data packets;
the second scheduling information comprises information used to indicate a quantity M2 of data packets that need to be transmitted on the secondary carrier; and
the second transition module is configured to acquire the M2 data packets from the N data packets.

4. The system according to claim 3, wherein:
the first scheduling information further comprises a first location or information used to calculate the first location, wherein the first location is a location of the data packet that needs to be transmitted on the primary carrier in the N data packets;
the first transition module is configured to acquire, from the N data packets, the M1 data packets indicated by the first location;
the second scheduling information further comprises a second location or information used to calculate the second location, wherein the second location is a location of the data packet that needs to be transmitted on the secondary carrier in the N data packets; and
the second transition module is configured to acquire, from the N data packets, the M2 data packets indicated by the second location.

5. The system according to claim 4, wherein:
the first location comprises an initial location of the M1 data packets in the N data packets;
the information used to calculate the first location comprises a quantity of data packets that precede the M1 data packets in the N data packets;
the second location comprises an initial location of the M2 data packets in N data packets; and
the information used to calculate the second location comprises a quantity of data packets that precede the M2 data packets in the N data packets.

6. The system according to claim 4, wherein:
the first transition module is further configured to determine the first location according to the information used to calculate the first location; and
the second transition module is further configured to determine the second location according to the information used to calculate the second location.

7. A data transmission device configured to serve a primary carrier of user equipment, the data transmission device comprising:
a first unit configured to process a radio link control (RLC) layer, the first unit comprising a first control module and a first transition module;
a second unit configured to process a Media Access Control (MAC) layer;
a third unit configured to process a Packet Data Convergence Protocol (PDCP) layer;
a first scheduling unit; and
wherein:
the first scheduling unit is configured to send first scheduling information to all transition modules in the data transmission device, wherein the first scheduling information comprises scheduling information of the primary carrier,
the first control module is configured to: receive data from the third unit, group the data into N data packets, and send the N data packets to the first transition module and the second transition module, wherein the second transition module is comprised in the first unit or comprised in another unit outside the transmission device, and
the first transition module is configured to: receive the N data packets and scheduling information sent by the first scheduling unit, acquire, according to the received scheduling information and from the N data packets, a data packet that needs to be transmitted on the primary carrier, and send the data packet acquired by the first transition module to the second unit.

8. The data transmission device according to claim 7, wherein the first control module is further configured to:
after sending the N data packets, request the first transition module and the second transition module for synchronization with the first control module, and send a data caching queue status to the first transition module and the second transition module, wherein the data caching queue status is used to indicate that a quantity of the data packets sent by the first control module is N.

9. The data transmission device according to claim 8, wherein:
the first scheduling information comprises information used to indicate a quantity M1 of data packets that need to be transmitted on the primary carrier; and
the first transition module is configured to acquire the M1 data packets from the N data packets.

10. The data transmission device according to claim 9, wherein:
the first scheduling information further comprises a first location or information used to calculate the first location, wherein the first location is a location of the data packet that needs to be transmitted on the primary carrier in the N data packets; and
the first transition module is configured to acquire, from the N data packets, the M1 data packets indicated by the first location.

11. The data transmission device according to claim 10, wherein:
the first location comprises an initial location of the M1 data packets in the N data packets; and
the information used to calculate the first location comprises a quantity of data packets that precede the M1 data packets in the N data packets.

12. A data transmission method for use with a data transmission device configured to serve a primary carrier of user equipment, and wherein the data transmission device comprises: a first unit configured to process a radio link control (RLC) layer and comprising a first control module and a first transition module, a second unit configured to process a Media Access Control (MAC) layer, a third unit configured to process a Packet Data Convergence Protocol (PDCP) layer, and a first scheduling unit, the method comprising:
sending, by the first scheduling unit, first scheduling information to the first transition module and a second transition module, wherein the first scheduling information comprises scheduling information of the primary carrier, the second transition module is comprised in the first unit or comprised in another unit outside the transmission device;
receiving, by the first control module, data from the third unit, grouping the data into N data packets, and sending the N data packets to the first transition module and the second transition module; and
receiving, by the first transition module, the N data packets and scheduling information sent by the first scheduling unit, acquiring, according to the received scheduling information and from the N data packets, a data packet that needs to be transmitted on the primary carrier, and sending the data packet acquired by the first transition module to the second unit.

13. The method according to claim 12, further comprising:
after sending the N data packets, requesting, by the first control module, the first transition module and the second transition module for synchronization with the first control module, and sending a data caching queue status to the first transition module and the second transition module, wherein the data caching queue status is used to indicate that a quantity of the data packets sent by the first control module is N.

14. The method according to claim 13, wherein:
the first scheduling information comprises information used to indicate a quantity M1 of data packets that need to be transmitted on the primary carrier; and
the first transition module is configured to acquire the M1 data packets from the N data packets.

15. The method according to claim 14, wherein:
the first scheduling information further comprises a first location or information used to calculate the first location, wherein the first location is a location of the data packet that needs to be transmitted on the primary carrier in the N data packets; and
the first transition module is configured to acquire, from the N data packets, the M1 data packets indicated by the first location.

16. The method according to claim 15, wherein:
the first location comprises an initial location of the M1 data packets in the N data packets; and
the information used to calculate the first location comprises a quantity of data packets that precede the M1 data packets in the N data packets.

17. The method according to claim 15, further comprising:
    determining, by the first transition module, the first location according to the information used to calculate the first location.

18. The method according to claim 13, wherein:
    receiving, by the first control module, a completion message from all the transition modules in the data transmission device, and sending a synchronization message as a response to the received completion message; and
    wherein the completion message is used to indicate that a transition module that sends the completion message has completed receiving of the N data packets of the data, and the synchronization message is used to instruct all the transition modules in the system to complete receiving of the N data packets of the data.

19. The method according to claim 18, further comprising:
    after learning that the first control module requests for synchronization and receiving the data caching queue status, determining, by the first transition module, whether acquiring of a data packet is completed; and
    if the acquiring of the data packets is completed, sending the completion message to the first control module, and receiving the synchronization message.

20. The method according to claim 12, further comprising:
    after receiving the data, determining, by the first control module, whether the data is the same as data sent to all transition modules in the method, and when a result of the determining is yes, grouping the data into N data packets; or
    after receiving the data, receiving, by the first control module, new data from the third unit and determining whether the new data is the same as data sent to all transition modules in the method, and when a result of the determining is no, waiting until data sent next time is received.

* * * * *